United States Patent
Takayama et al.

(10) Patent No.: US 8,032,696 B2
(45) Date of Patent: Oct. 4, 2011

(54) DECODING DEVICE AND SEMICONDUCTOR DEVICE WHICH READ FILE REWRITING DISCRIMINATION INFORMATION

(75) Inventors: Tsuyoshi Takayama, Shiga (JP); Akihiro Shibata, Saitama (JP)

(73) Assignee: Panasonic Corporation, Osaka (JP)

( * ) Notice: Subject to any disclaimer, the term of this patent is extended or adjusted under 35 U.S.C. 154(b) by 374 days.

(21) Appl. No.: 12/364,111

(22) Filed: Feb. 2, 2009

(65) Prior Publication Data
US 2009/0204568 A1 Aug. 13, 2009

(30) Foreign Application Priority Data
Feb. 7, 2008 (JP) ................................. 2008-027272

(51) Int. Cl.
*G06F 12/00* (2006.01)

(52) U.S. Cl. ................. 711/112; 711/115; 711/E12.001

(58) Field of Classification Search .................. None
See application file for complete search history.

(56) References Cited

U.S. PATENT DOCUMENTS

| | | | |
|---|---|---|---|
| 4,706,233 | A | 11/1987 | D'Alayer de Costemore D'Arc |
| 6,388,961 | B1 | 5/2002 | Ijichi |
| 2001/0026514 | A1 | 10/2001 | Izawa |
| 2003/0151992 | A1 | 8/2003 | Fujimoto et al. |
| 2006/0206592 | A1* | 9/2006 | Fujii et al. ............ 709/220 |
| 2008/0154406 | A1* | 6/2008 | Nunokawa ............ 700/94 |
| 2009/0174525 | A1* | 7/2009 | Yamauchi ............ 340/5.8 |

FOREIGN PATENT DOCUMENTS

| | | |
|---|---|---|
| JP | 2007-178646 | 7/2007 |
| JP | 2007-179632 | 7/2007 |
| JP | 2007-179634 | 7/2007 |

* cited by examiner

*Primary Examiner* — Kevin Verbrugge
(74) *Attorney, Agent, or Firm* — McDermott Will & Emery LLP

(57) ABSTRACT

When an external recording medium connected to an interface is removed therefrom and a new external recording medium is connected to the interface, a processor selects either first file analysis information read from a memory or second file analysis information generated based on analysis of data recorded on the new external recording medium as file analysis information to be used for decoding a file stored in the new external recording medium, and the processor makes such selection based on comparison between first recording medium management information and second recording medium management information.

15 Claims, 10 Drawing Sheets

F I G. 2
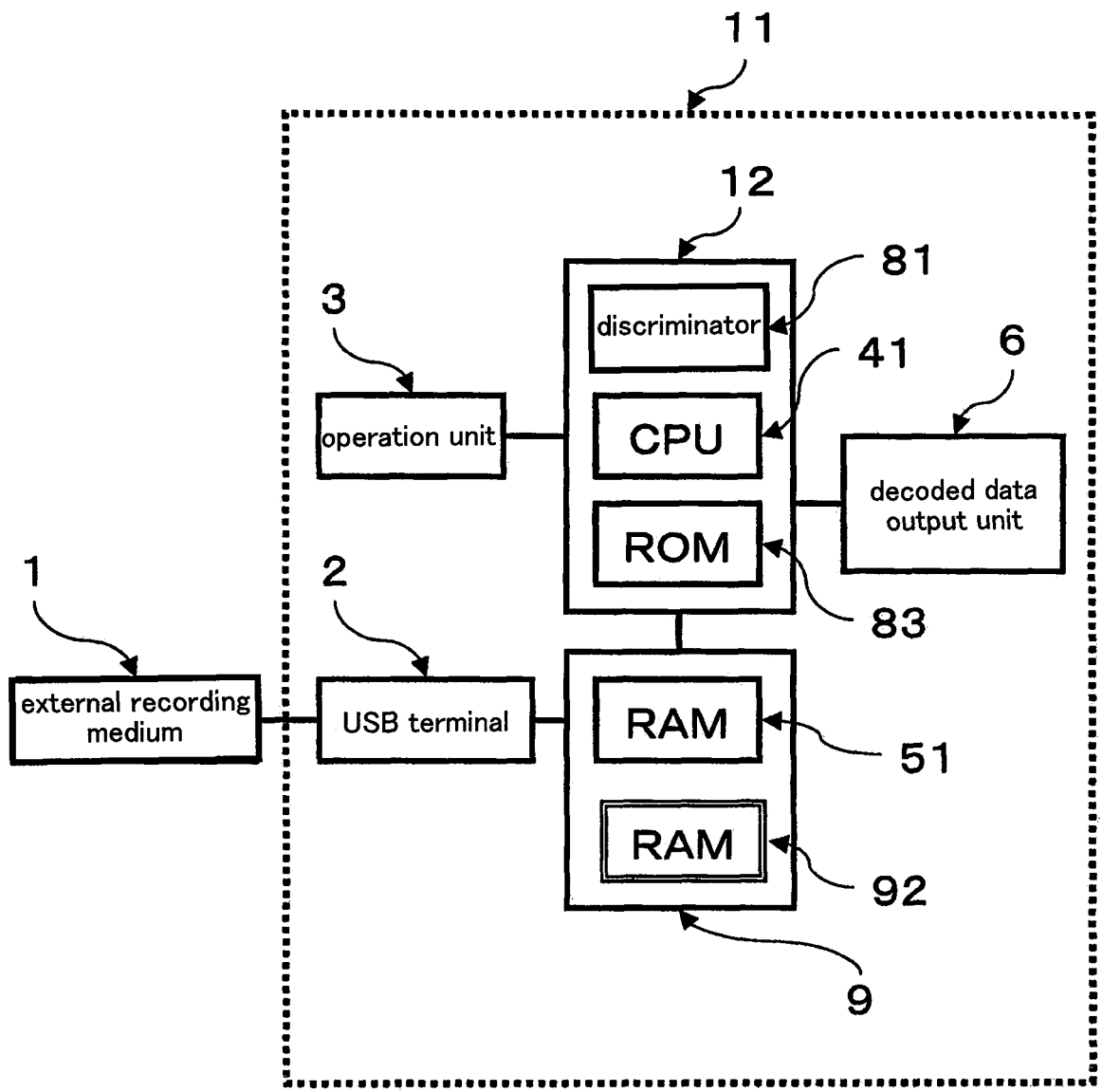

DECODING DEVICE AND SEMICONDUCTOR DEVICE WHICH READ FILE REWRITING DISCRIMINATION INFORMATION

BACKGROUND OF THE INVENTION

1. Field of the Invention

The present invention relates to a decoding device which decodes a file read from an external recording medium. Examples of the decoding processes are to decompress a compressed music file and decompress compressed image data to reproduce the data.

2. Description of the Related Art

Referring to FIG. 10, a conventional decoding device which executes a decoding process, such as the reproduction of a compressed file, is described. The compressed file is obtained through a USB interface or the like. An external recording medium 1 is detachably provided in a decoding device 7. The decoding device 7 comprises an interface 2, an operation unit 3, a processor 4, a memory 5, and a decoded data output unit 6. The processor 4 comprises a CPU 41 and a ROM 42. The memory 5 comprises a RAM 51. The processor 4 executes the decoding process using the memory 5.

Below is described an operation of the decoding device 7. First, the external recording medium 1 is connected to the decoding device 7, and a "reproduction button" of the operation unit 3 is then pressed by an operator. Responding to the operation of the operation unit 3, the processor 4 analyzes data recorded on the external recording medium 1 via the interface 2 comprising a USB terminal.

In the case where the decoding device 7 is compliant with the reproduction of a recording medium having a plurality of file structures, first, the file structures of the external recording medium 1 are discriminated from one another. After the file structures are thus identified, information of all of files and folders stored in the external recording medium 1 is read therefrom. Based on the read information, the parentage of the respective files and folders, the total number of the files stored in the respective folders and the external recording medium 1, the total number of the folders, and the like are analyzed.

An analysis result thereby obtained is stored in the memory 5 as file analysis information, and a file designated by the operation unit 3 is thereafter read. Then, the read file is decoded by the decoded data output unit 6, so that data, such as music data, is reproduced.

There is a case in which a power supply for the whole decoding device 7 is disconnected after the external recording medium 1 is analyzed by the decoding device 7, or the external recording medium 1 is removed from the decoding device 7 and reconnected thereto after the external recording medium 1 was analyzed as described. In that case, the external recording medium 1 is regarded by the decoding device 7 as an unknown external recording medium which has not been analyzed yet. As a result, a reproduction instruction is given to the external recording medium 1 by the operation unit 3, and the file analysis is repeated. This technology is recited in, for example, the Japanese Patent Documents (2007-178646 and 2007-179632 of the Japanese Patent Applications Laid-Open). However, in the foregoing cases, the decoding device 7 repeats the file analysis to the external recording medium 1 which was already analyzed once, which makes the data reproduction unnecessarily time-consuming.

SUMMARY OF THE INVENTION

Therefore, a main object of the present invention is to provide a decoding device capable of reducing an amount of time necessary for the reproduction of data stored in an external recording medium.

A decoding device according to the present invention comprises an interface to which an external recording medium in which recording medium management information and an encoded file are stored is connected;

a processor for decoding the file read from the external recording medium using file analysis information obtained by analyzing data recorded on the external recording medium; and a memory in which the file analysis information generated by the processor and the recording medium management information read from the external recording medium are stored.

The processor operates as below. When the external recording medium connected to the interface is removed therefrom and a new external recording medium is connected to the interface, the processor selects either first file analysis information read from the memory or second file analysis information generated based on the analysis of the data recorded on the new external recording medium as the file analysis information to be used for decoding the file stored in the new external recording medium, and the processor makes such selection based on the comparison between first recording medium management information stored in the memory and second recording medium management information read from the new external recording medium.

According to the present invention thus constituted, an amount of time necessary for the reproduction of data can be reduced in the case where an external recording medium is reconnected.

The decoding device according to the present invention can detect the fact that an external recording medium whose data was already reproduced is reconnected using recording medium management information such as recording medium discrimination information and file rewriting discrimination information. Thus constituted, the file analysis information stored in the memory can be directly used for a reproduction process. Further, since the amount of time necessary for a file analysis process can be reduced, the amount of time necessary for the reproduction to start can be shortened.

As described above, according to the present invention, the amount of time necessary for the reproduction to start can be reduced when an external recording medium, such as a flash memory, is connected to the decoding device.

BRIEF DESCRIPTION OF THE DRAWINGS

These and other objects as well as advantages of the invention will become clear by understanding preferred embodiments of the invention described below and be specified in the claims attached hereto. A number of benefits not recited in this specification will come to the attention of the skilled in the art upon the implementation of the present invention.

FIG. 2 is a circuit diagram illustrating a system configuration according to a preferred embodiment 4 of the present invention.

FIG. 10 is a circuit diagram illustrating a conventional system configuration.

DETAILED DESCRIPTION OF THE INVENTION

Preferred Embodiment 1

Figure 1:
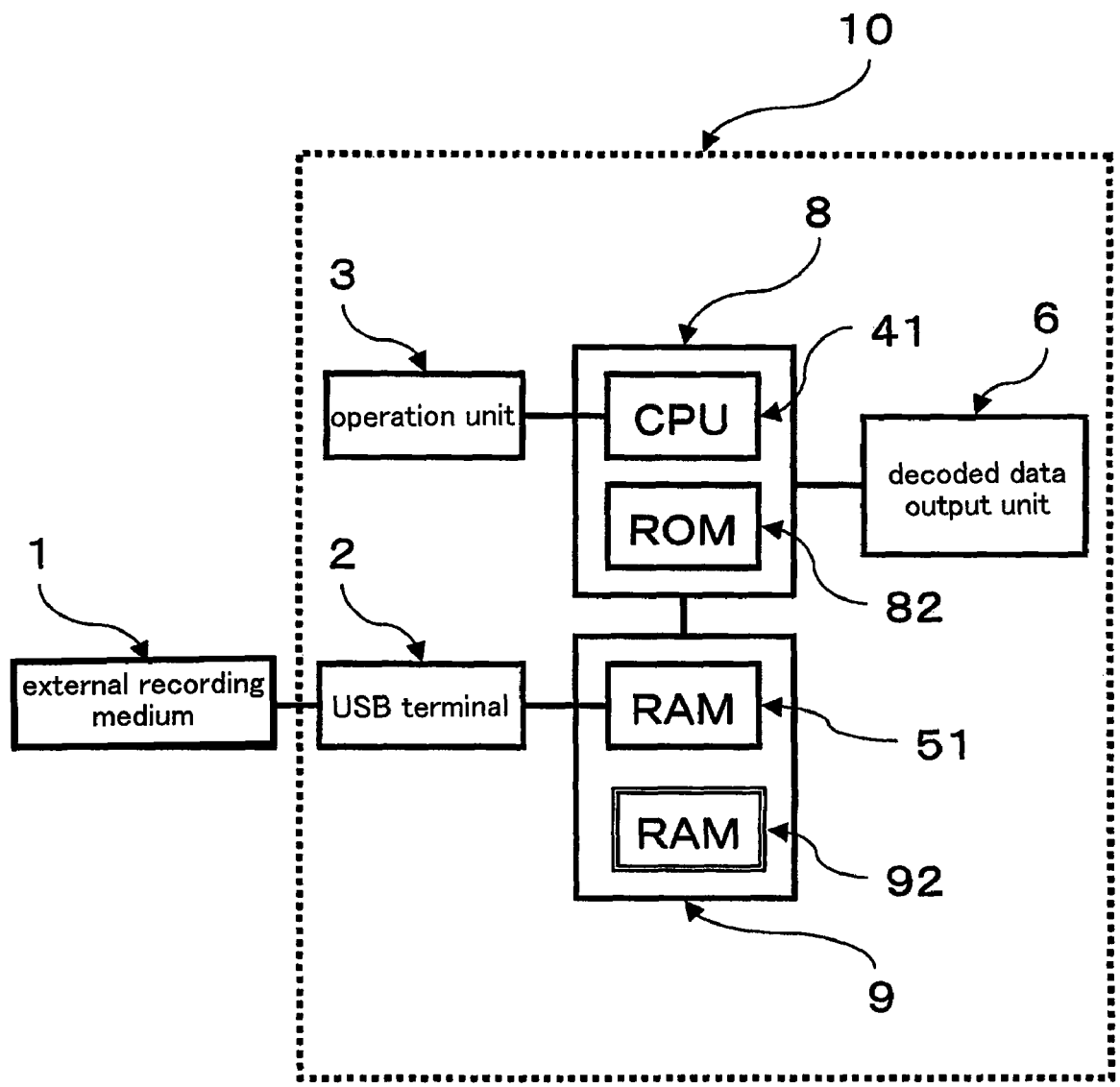
FIG. 1 is a circuit diagram illustrating a system configuration according to a preferred embodiment 1 of the present invention.

A decoding device according to a preferred embodiment 1 of the present invention is described referring to the drawings. Referring to FIG. 1, a decoding device 10 comprises an interface 2 comprising a USB terminal, an operation unit 3, a decoded data output unit 6, a processor 8, and a memory 9. The interface 2, operation unit 3 and output unit 6 respectively function as illustrated referring to FIG. 10. The processor 8 comprises a CPU 41 and a ROM 82. The processor 8 can executes a processing flow illustrated in FIG. 3 as described later. The memory 9 comprises a RAM 51 and a second RAM 92. A memory which can retain data even when power supply is disconnected, such as EEPROM, constitutes the RAM 92, while the RAM 51 is a memory incapable of retaining data when power supply is shut down.

Figure 3:
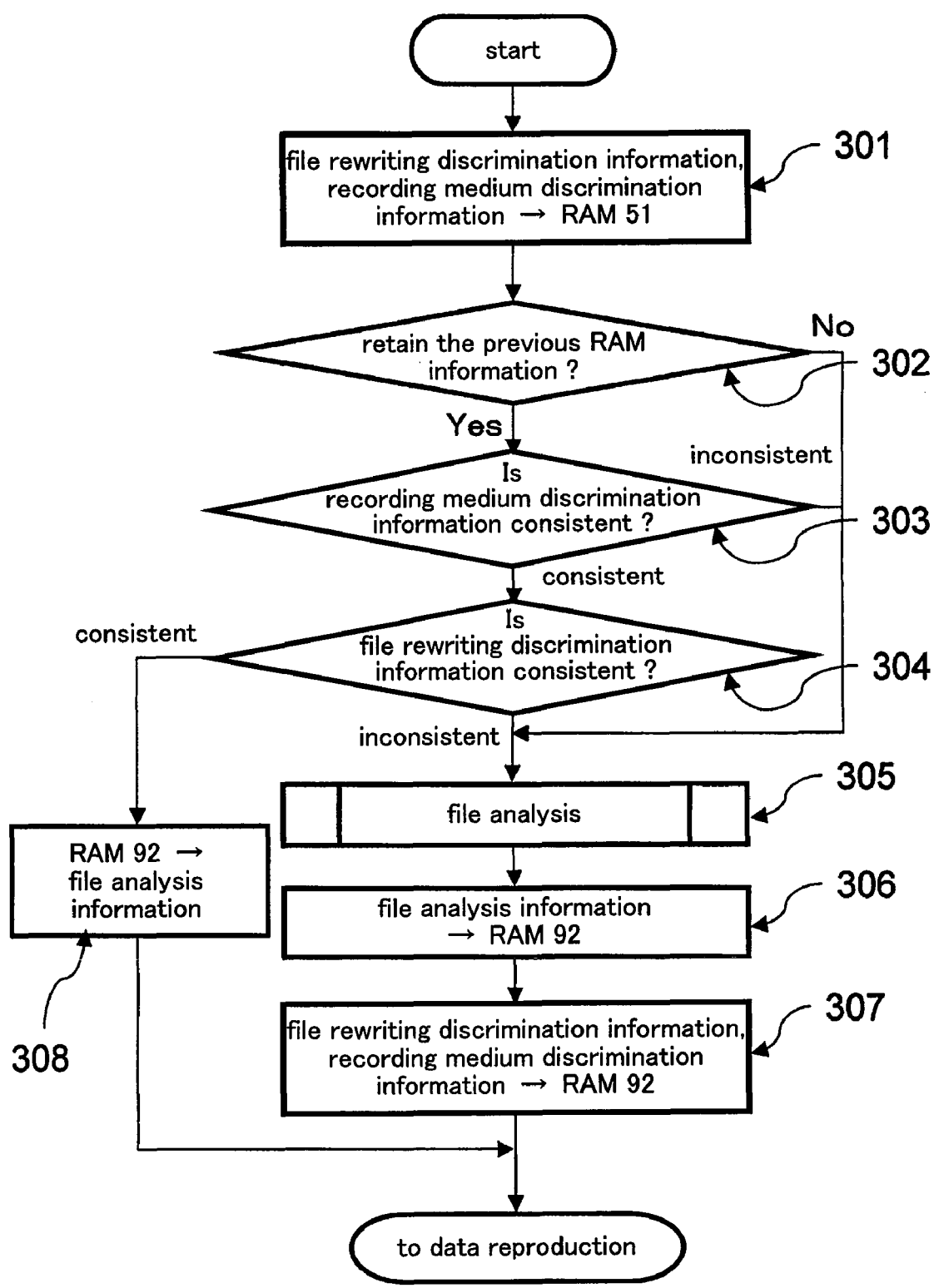
FIG. 3 is a processing flow chart according to the preferred embodiment 1.

Referring to FIG. 3, a decoding process executed by the decoding device 10 is described below. The description given below is based on the premise that recording medium discrimination information and file rewriting discrimination information are recorded on the external recording medium 1 as recording medium management information.

The discrimination of the external recording medium 1 is to discriminate a plurality of external recording media 1 from one another. The external recording medium discrimination information is information attached to the respective external recording media 1 (for example, "device ID" or "product ID") in order to discriminate the respective external recording media 1 from one another. The external recording medium discrimination information is recorded on the respective external recording media 1.

File rewriting discrimination is to determine whether or not data recorded on the same external recording medium 1 was rewritten. The file rewriting discrimination information is information which changes whenever the data recorded on the same external recording medium 1 is rewritten. Examples of the changing information are "available memory space," "rewriting date and time" and "folder and file physical positions."

First, the external recording medium 1 is connected to the interface 2. As a result of the connection, the recording medium management information recorded on the external recording medium 1 is read and retained in the RAM 51 of the memory 9 in processing step 301.

In processing step 302, it is determined whether or not first recording medium management information (recording medium discrimination information and file rewriting discrimination information at the time of the previous connection) is retained in the RAM 92 of the memory 9. In the case where it is determined in processing step 302 that the first recording medium management information is not retained in the RAM 92 of the memory 9, the processing shifts to processing step 305.

In processing step 305, which is a file analyzing step, file analysis for the external recording medium 1 currently connected is performed. After the file analysis, file analysis information indicating a result of the analysis and the recording medium management information (recording medium discrimination information and file rewriting discrimination information) read from the external recording medium 1 in processing step 301 are retained in the RAM 92 of the memory 9 as the first recording medium management information and first file analysis information.

When the decoding device 10 is powered off after the processes described so far are executed, the information recorded on the RAM 51 of the memory 9 is lost, while the information stored in the RAM 92 is retained.

When the decoding device 10 is powered on again and "reproduction instruction" is given by the operation unit 3, second recording medium management information (recording medium discrimination information and file rewriting discrimination information) is read from the external recording medium 1 (hereinafter, an external recording medium used after the power is supplied again is referred to as a new external recording medium) in processing step 301.

After that, it is checked whether or not the first recording medium management information (recording medium discrimination information and file rewriting discrimination information at the time of the previous connection) and the first file analysis information (file analysis information analyzed at the time of the previous connection) are stored in the RAM 92. When the storage of the information in the RAM 92 is verified, the processing shifts to processing step 303.

In processing steps 303 and 304, it is determined whether or not the second recording medium management information (recording medium discrimination information and file rewriting discrimination information) read in processing step 301 is the same as the first recording medium management information retained in the RAM 92.

In the case where it is determined in processing step 304 that they are the same information, the processing shifts to processing step 308, wherein the first file analysis information stored in the RAM 92 is read therefrom without file analysis of the file currently read.

In the case where it is determined in processing step 304 that they are not the same information, the processing shifts to processing step 305, wherein the file newly read from the new external recording medium 1 (recording medium management information recorded on the external recording medium 1) is analyzed.

The description given above is based on the case where only the information of the external recording medium 1 connected immediately before is retained in the RAM 92. However, information of a plurality of external recording media 1 which have been connected in the past may be retained in the RAM 92. In the case where the second recording medium management information of the new external recording medium 1 is inconsistent with the first recording medium management information in the external recording medium 1 connected immediately before but is consistent with the first recording medium management information in the external recording medium 1 which was connected in the past, the file analysis is skipped, and the processing can shift to processing step 308.

Preferred Embodiment 2

Figure 4:
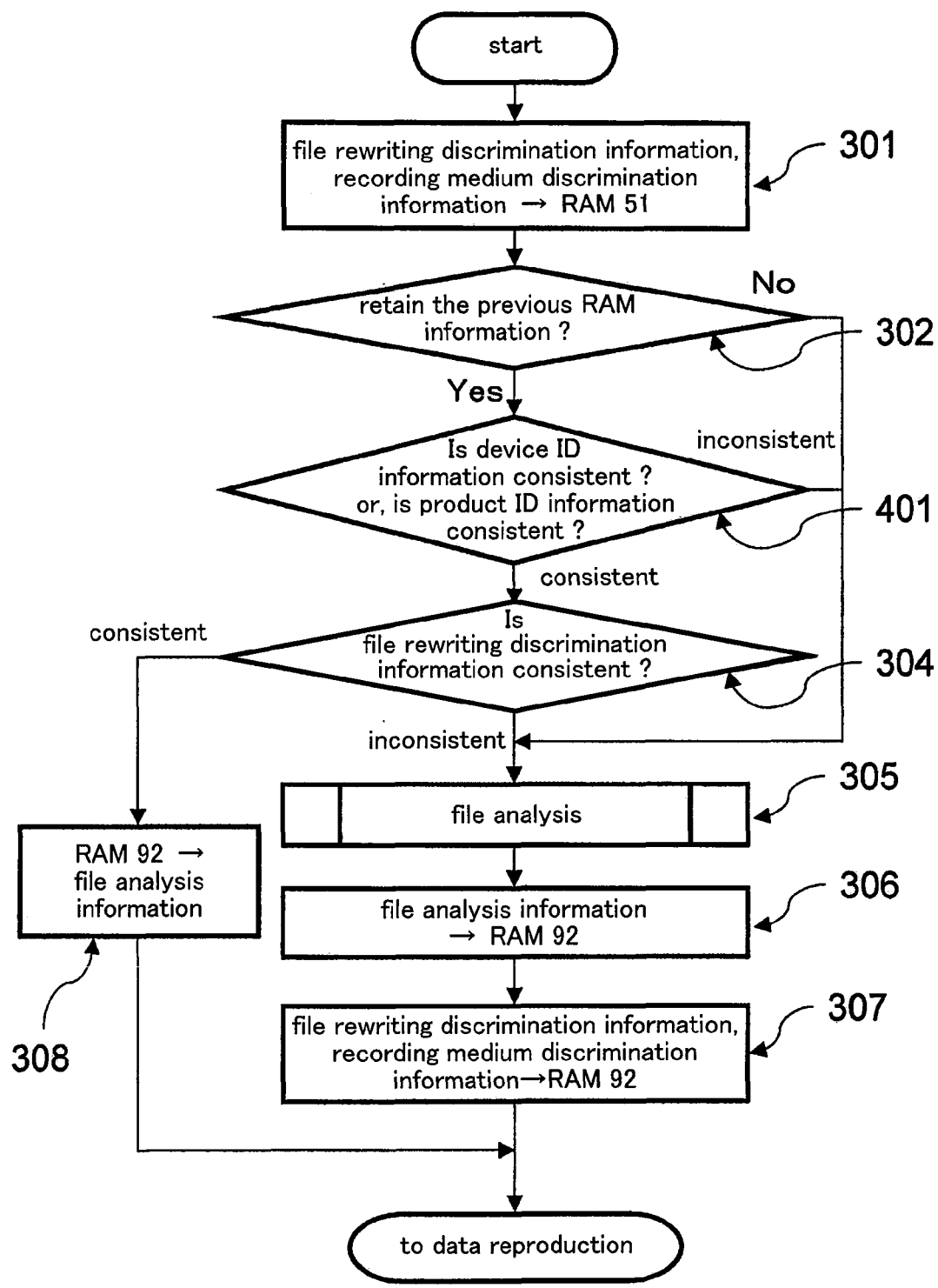
FIG. 4 is a processing flow chart according to a preferred embodiment 2 of the present invention.

A preferred embodiment 2 of the present invention is described referring to a processing flow illustrated in FIG. 4.

In the processing flow illustrated in FIG. 4, processing step 303 in the processing flow illustrated in FIG. 3 is replaced with processing step 401 which is more specific.

In processing step 401, it is determined whether or not at least one of "device ID" and "product ID" individually allocated to and recorded on each external recording medium 1 as the recording medium discrimination information in order to discriminate the external recording media 1 from one another is authentic, so that the new external recording medium 1 is physically discriminated from the other external recording media 1. The information of a plurality of external recording media 1 may be used as the "device ID" and "product ID" information.

Preferred Embodiment 3

Figure 5:
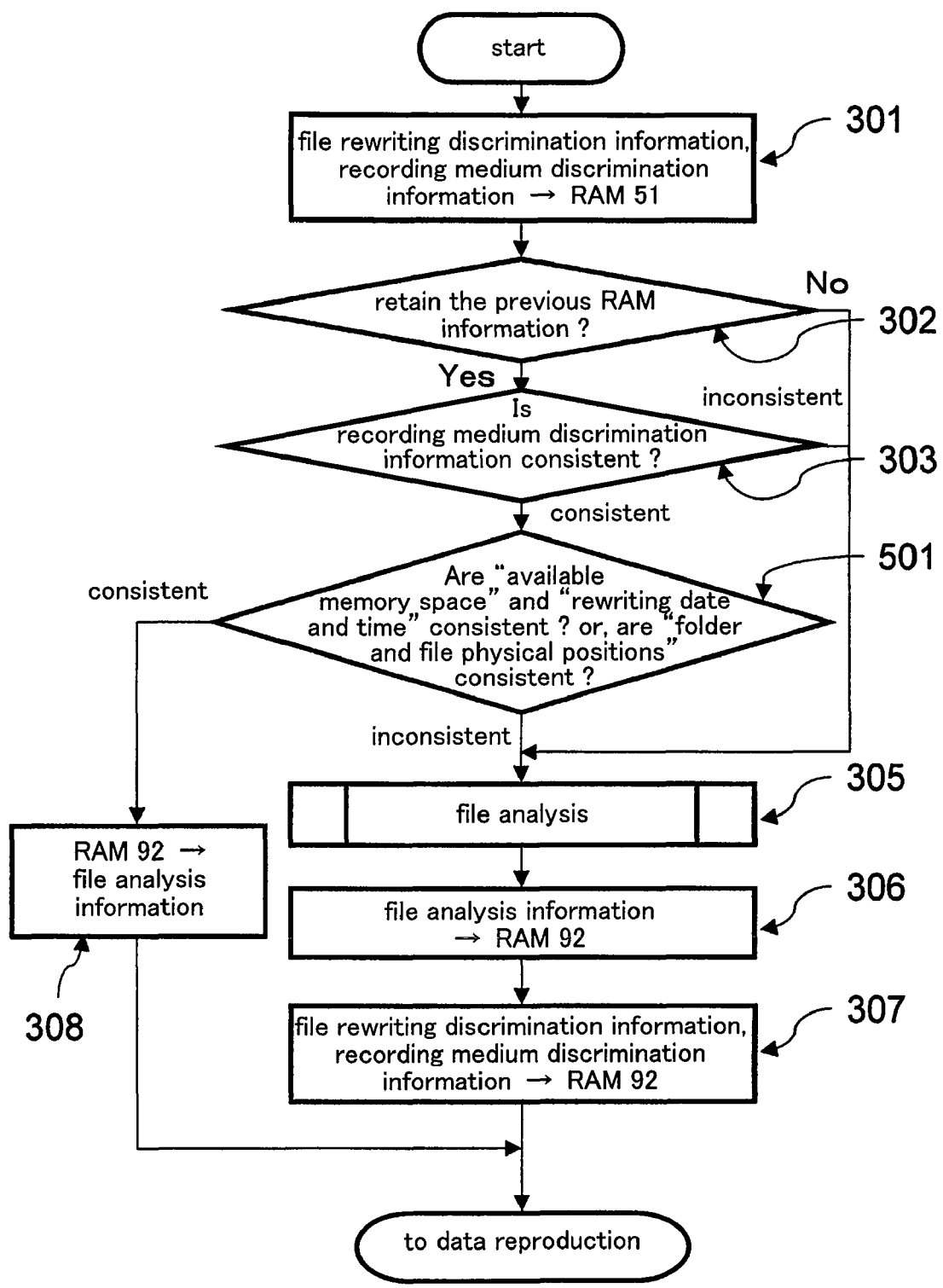
FIG. 5 is a processing flow chart according to a preferred embodiment 3 of the present invention.

A preferred embodiment 3 of the present invention is described referring to a processing flow illustrated in FIG. 5. In the processing flow illustrated in FIG. 5, processing step 501 is added to processing step 304 in the processing flow illustrated in FIG. 3.

In processing step 501, it is determined whether or not the file rewriting discrimination information indicating any of "available memory space," "rewriting date and time" and "folder and file physical positions" read from the new external recording medium 1 currently connected is consistent with any of the second recording medium management information (file rewriting discrimination information indicating any of "available memory space," "rewriting date and time" and "folder and file physical positions" of an external recording medium 1) read from the external recording medium 1 previously connected and stored in the second RAM 92.

In the constitution described earlier, based on the determination that the new external recording medium 1 newly connected to the interface 2 is the same as the external recording medium 1 which was connected in the past (processing step 303), a determination whether or not the data was rewritten in the new external recording medium 1 judged to be the same as the external recording medium 1 which was connected in the past based on the file rewriting discrimination information ("available memory space," "rewriting date and time" and "folder and file physical positions"). The information of a plurality of external recording media 1 may be used as the file rewriting discrimination information.

Preferred Embodiment 4

Figure 6:
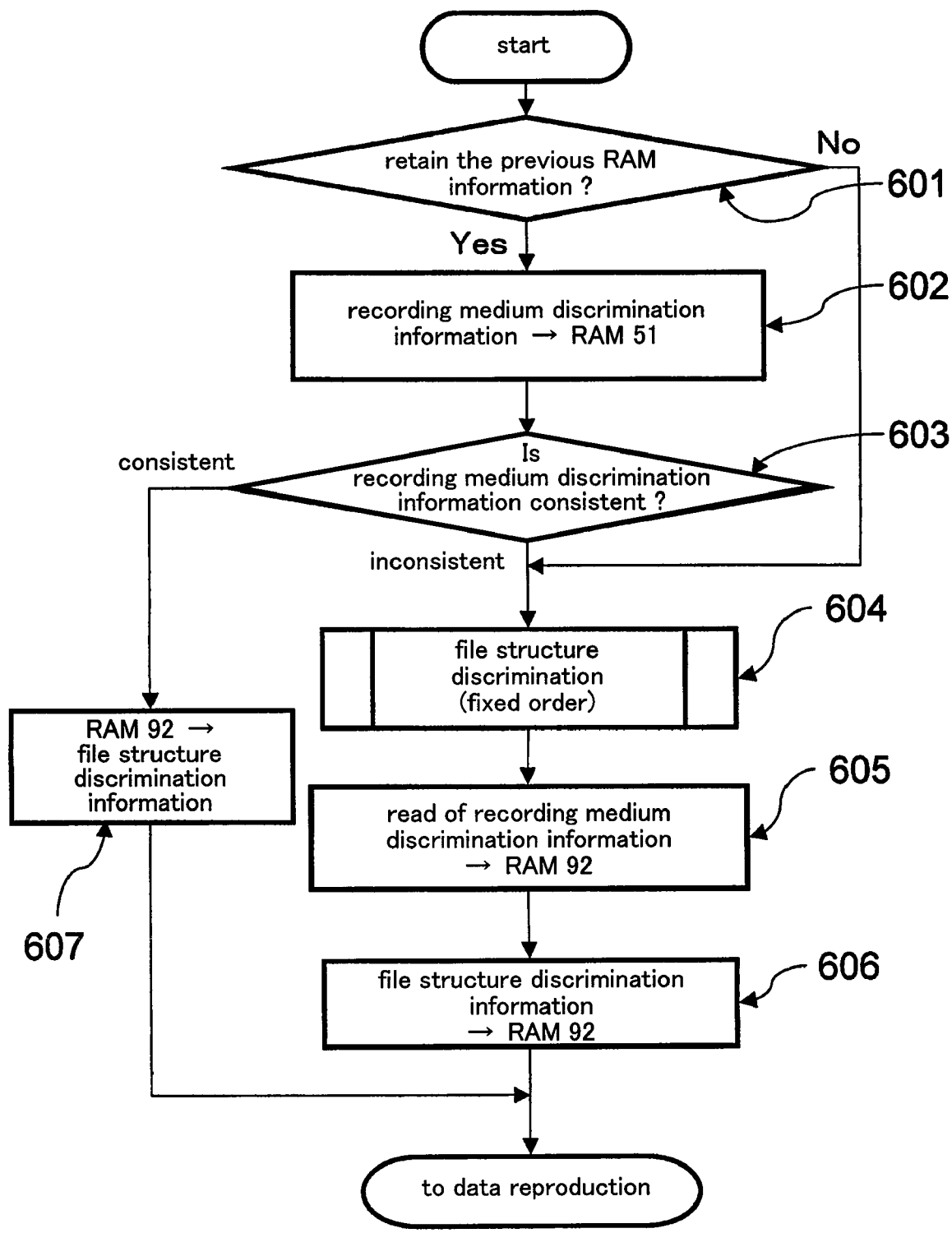
FIG. 6 is a processing flow chart according to the preferred embodiment 4.

A preferred embodiment 4 of the present invention is described referring to FIGS. 2 and 6. A decoding device 11 is basically constituted in a manner similar to the preferred embodiment 1. The decoding device 11 further comprises a discriminator 81 for discriminating file structures of the external recording medium 1 from one another.

An operation of the decoding device 11 is described referring to FIG. 6. First, the new external recording medium 1 is connected to the interface 2. As a result of the connection, it is determined in processing step 601 whether or not the first recording medium management information of the external recording medium 1 previously connected (file structure discrimination information) is stored in the memory 9 (more specifically, second RAM 92).

In the case where it is determined in processing step 601 that the first recording medium management information of the external recording medium 1 previously connected (file structure discrimination information) is not retained in the memory 9 (more specifically, second RAM 92), the processing shifts to processing step 604 (file structure discriminating process).

In processing step 604, the discriminating process is executed to the file structure identification information in the new external recording medium 1 currently connected. After processing step 604 (file structure discriminating process), the recording medium discrimination information is read from the new external recording medium 1 and stored in the RAM 92 as the first recording medium management information in processing step 605.

In processing step 606, the file structure discrimination information indicating a result of the discriminating process in processing step 604 is stored in the RAM 92 of the memory 9 as the first recording medium management information.

Thus, the file structure discrimination information and the recording medium discrimination information read from the external recording medium 1 are stored in the RAM 92 of the memory 9 as the first recording medium management information.

Examples of the recording medium discrimination information may be "device ID" and "product ID" in a manner similar to the preferred embodiment 2. Examples of the file structure discrimination information are MSC (Mass Storage Class), MTP (Media Transfer Protocol), and information relating to communication standards used for recording data on the external recording medium 1 such as "Audio Class" and "HID Class".

When the decoding device 11 is powered off after the foregoing processes are implemented, the information recorded on the RAM 51 is lost, while the recording medium management information stored in the second RAM 92 is retained as the first recording medium management information.

When the decoding device 1 is powered on again and "reproduction instruction" is given by the operation unit 3 (hereinafter, referred to as power supply recovery), it is determined in processing step 601 whether or not first file structure discrimination information (file structure identification information at the time of the previous connection of the external recording medium 1 to the interface 2) and the first recoding medium discrimination information (recoding medium discrimination information at the time of the previous connection of the external recording medium 1 to the interface 2) are stored in the RAM 92 of the memory 9 as the first recording medium management information.

In the case where the power supply is recovered, it is determined in processing step 601 that the first file structure discrimination information is stored in the second RAM 92. When such determination is made, the processing shifts to processing step 602, wherein the second recording medium discrimination information (recording medium discrimination information of the external recording medium 1 currently connected to the interface) is read from the new external recording medium 1 as the second recording medium management information.

In processing step 603, it is determined whether or not the second recording medium discrimination information is the same as the first recording medium discrimination information retained in the second RAM 92 (recording medium discrimination information read from the external recording medium 1 previously connected to the interface 2 and retained in the second RAM 92).

In the case where the power supply is recovered, it is determined in processing step 603 that they are the same information. In that case, the processing shifts to processing step 607, wherein the first file structure discrimination information retained in the second RAM 92 is read without the file structure discriminating process of the information currently read.

In the case where it is determined in processing step 603 that they are not the same information (power supply is not recovered), the processing shifts to processing step 604, wherein the file structure discriminating process is executed again.

Then, the first recording medium management information stored in the RAM 92 is updated by the second recording medium discrimination information read in processing step 602 and the second file structure discrimination information obtained in processing step 604.

In the present preferred embodiment, the information retained in the RAM 92 may be the information of a plurality of external recording media 1 which were connected in the past other than the information of the external recording medium 1 connected immediately before. In the case where the information of the external recording medium 1 newly connected is inconsistent with the information of the external recording medium 1 connected immediately before but is consistent with the information of the external recording medium 1 which was connected in the past, the processing can shift to processing step 607 without the file structure discriminating process.

Preferred Embodiment 5

Figure 7:
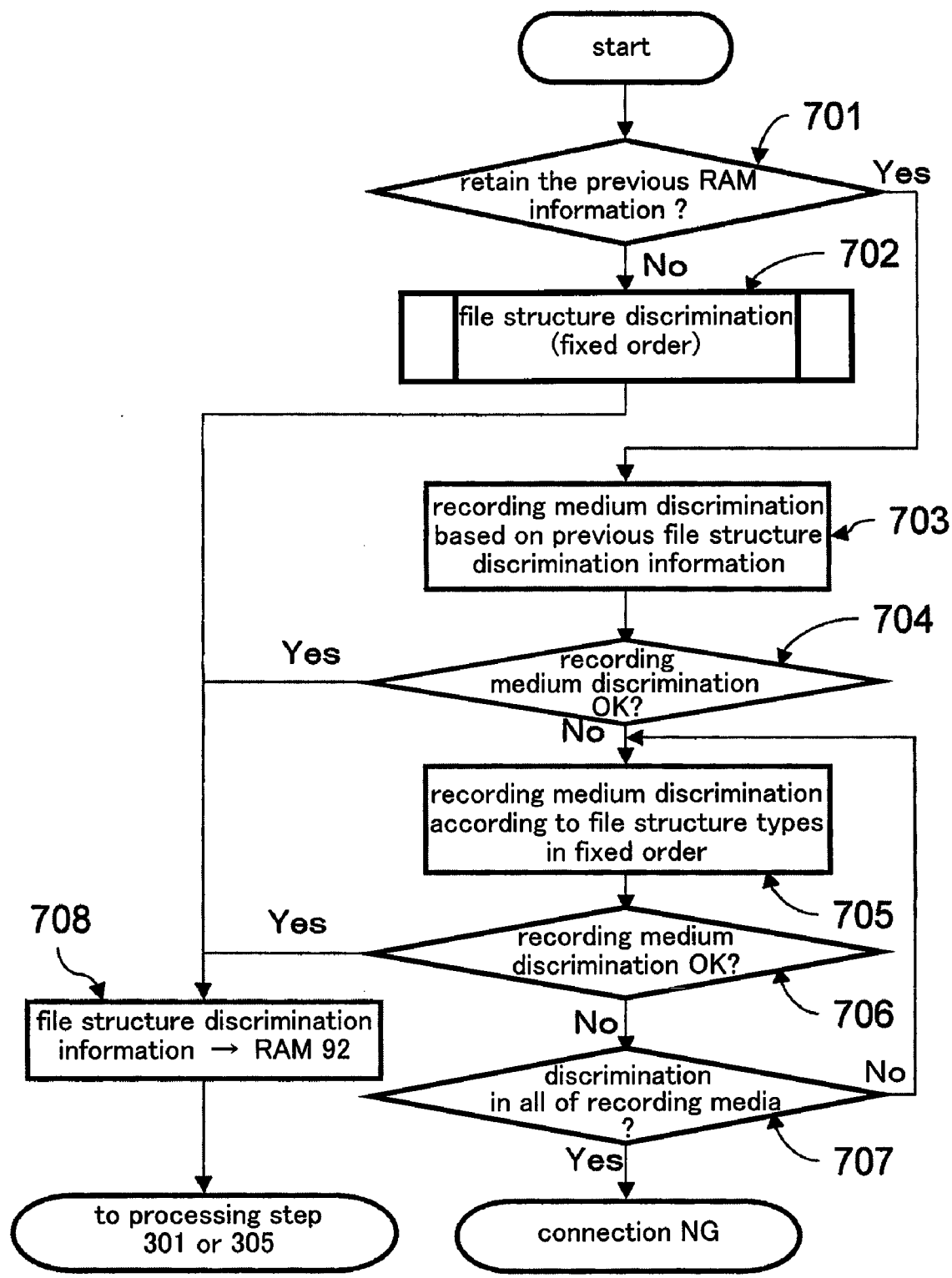
FIG. 7 is a processing flow chart according to a preferred embodiment 5 of the present invention.

A preferred embodiment 5 of the present invention is described referring to a processing flow illustrated in FIG. 7. In the preferred embodiment 5, the external recording medium 1 does not comprises the recording medium discrimination information.

When the external recording medium 1 is connected to the interface 2, it is determined in processing step 701 whether or not the first file structure discrimination information (file structure discrimination information at the time of the previous connection of the external recording medium 1 to the interface) is stored in the RAM 92 of the memory 9 as the first recording medium management information.

In the case where it is determined in processing step 701 that the first file structure discrimination information is not stored in the RAM 92 of the memory 9, the processing shifts to processing step 702 (file structure discriminating process).

In processing step 702, the file structure discriminating process for the external recording medium 1 currently connected is executed. The new file structure discrimination information obtained by the file structure discriminating process in processing step 702 is stored in the RAM 92 as the first recording medium management information in processing step 708. Examples of the file structure discrimination information are MSC (Mass Storage Class), MTP (Media Transfer Protocol), and information relating to communication standards used for recording data on the external recording medium 1 such as "Audio Class" and "HID Class" in a manner similar to the preferred embodiment 4.

When the decoding device 11 is powered off after the processes described so far are executed, the information stored in the RAM 51 is lost, while the first file structure discrimination information stored in the RAM 92 is retained. When the decoding device 11 is powered on again and "reproduction instruction" is given by the operation unit 3 (power supply is recovered), it is determined in processing step 701 whether or not the first file structure discrimination information is stored in the RAM 92. In the case where the power supply is recovered, it is determined in processing step 701 that the first file structure discrimination information is stored in the RAM 92. When such determination is made, the processing shifts to processing step 703, wherein the recording medium discriminating process is executed based on the first file structure discrimination information retained in the RAM 92.

In the case where the result of the recording medium discrimination shows NG, the first file structure discrimination information used in the recording medium discriminating process is deemed incorrect. Based on this viewpoint, the recording medium discriminating process is repeatedly executed in processing steps 705-707 based on the first file structure identification information recorded with the highest priority. In order to perform the discrimination processes in this manner, a plurality of pieces of first file structure discrimination information respectively having different priority orders are stored in the RAM 92.

In the case where the recording medium discrimination result obtained in the discriminating process based on any piece of the first file structure discrimination information shows OK, the file structure discrimination information whose recording medium discrimination result has shown OK is stored in the second RAM 92 as the first file structure discrimination information (first recording medium management information) in processing step 708, and the processing shifts to processing step 301 or 305 (file analysis) illustrated in FIG. 3.

In the case where discrimination results of all of the file structures NG, the determination that "connection is NG" is made in processing step 707.

Preferred Embodiment 6

Figure 8:
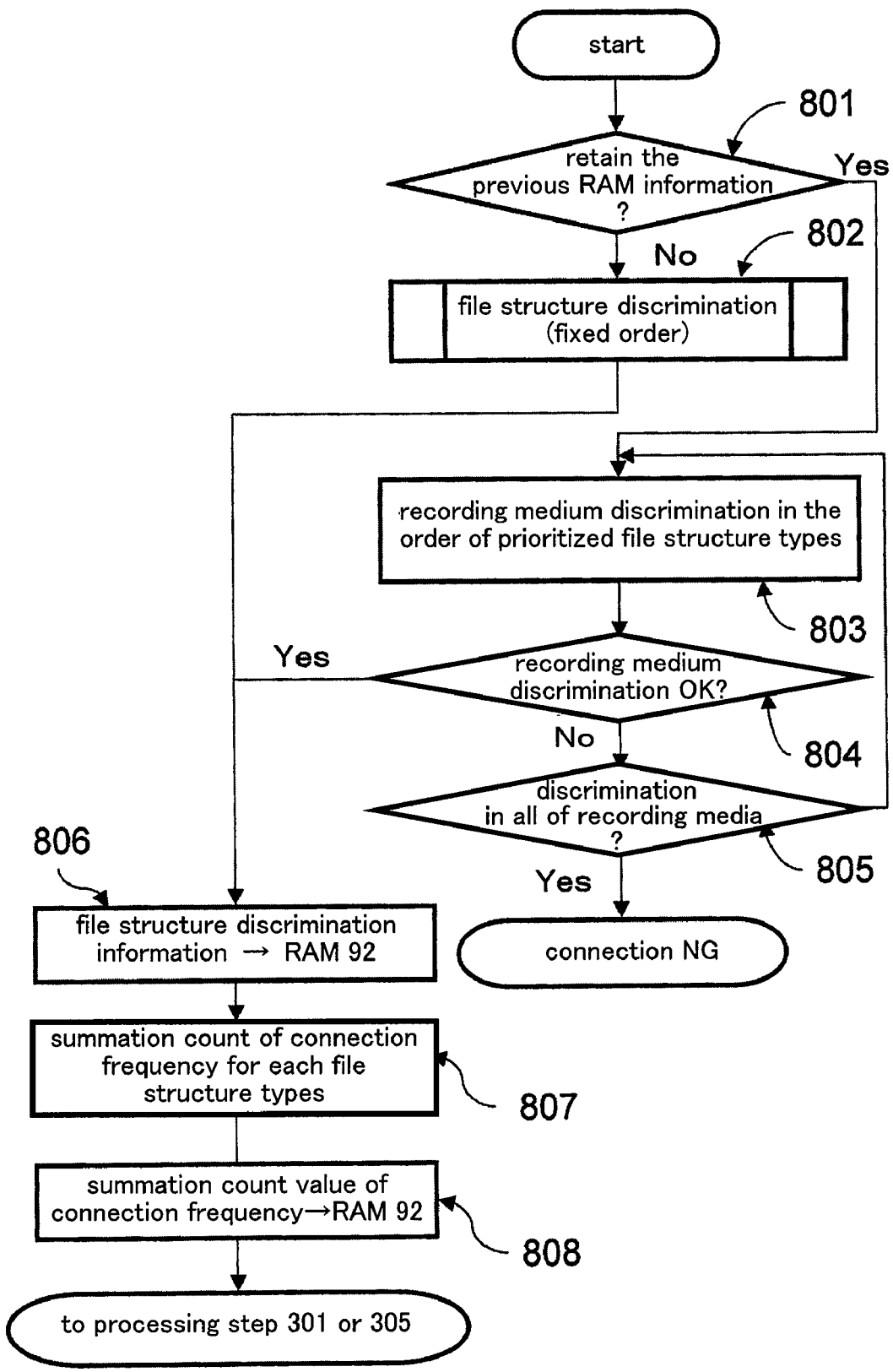
FIG. 8 is a processing flow chart according to a preferred embodiment 6 of the present invention.

A preferred embodiment 6 of the present invention is described referring to a processing flow illustrated in FIG. 8. In the processing flow illustrated in FIG. 8, when the external recording medium 1 is connected to the interface 2, it is determined in processing step 801 whether or not the first file structure identification information (file structure discrimination information at the time of the previous connection of the external recording medium 1 to the interface) is stored in the RAM 92 of the memory 9 as the first recording medium management information.

In the case where it is determined in processing step 801 that the first file structure discrimination information is not stored in the RAM 92 of the memory 9, the processing shifts to processing step 802 (file structure discrimination process).

The file structure discrimination process for the external recording medium 1 currently connected is executed in processing step 802. The file structure discrimination information obtained in processing step 802 (file structure discrimination process) is stored in the second RAM 92 as the first file structure discrimination information in processing step 806. Examples of the file structure identification information are MSC (Mass Storage Class), MTP (Media Transfer Protocol), and information relating to communication standards used for recording data in the external recording medium 1 such as "Audio Class" and "HID Class" in a manner similar to the preferred embodiment 4.

After the implementation of processing step 806, a connection frequency summation counting process is executed in order to weight the first file structure discrimination information in processing step 807. A count value showing the connection frequency calculated in processing step 807 is stored in the second RAM 92 in processing step 808.

When the decoding device 11 is powered off after the processes described so far are executed, the information stored in the RAM 51 is lost, while the first file structure discrimination information stored in the RAM 92 is retained. When the decoding device 11 is powered on again and "reproduction instruction" is given by the operation unit 3 (power supply is recovered), it is determined in processing step 801 whether or not the first file structure discrimination information is stored in the RAM 92.

In the case where the power supply is recovered, it is determined in processing step 801 that the first file structure identification information is stored in the RAM 92. When such determination is made, the processing shifts to processing step 803. In processing step 803, the discriminating process for the external recording medium is executed based on the first file structure discrimination information retained in the RAM 92.

The recording medium discrimination process according to the present preferred embodiment is the same as that of the preferred embodiment 5. In processing step 803 according to the present preferred embodiment, however, the recording medium discriminating process is repeated in the order in which a recording medium discrimination process using the first file structure discrimination information with more connection frequency is prioritized based on the count value of the connection frequency stored in the RAM 92 (information of the past connection frequency which was weighted).

In the case where respective results of the recording medium discriminating process show NG, the discrimination process for the external recording medium is repeated while the file structure types are sequentially selected in the order of descending priorities. In the case where the discrimination result obtained in any of the discriminating processes shows OK, processing step 807 (counting the total of the connection frequency for weighting the file structure discrimination information) is implemented, and the total count value is stored in the second RAM 92. Then, the processing shifts to processing step 301 or 305 (file analysis) illustrated in FIG. 3.

In the case where all of the file structure types are NG after the recording medium discrimination process is repeatedly performed, the determination that "connection is NG" is made in processing step 805.

Processing step 604 illustrated in FIG. 6, processing step 702 illustrated in FIG. 7 and processing step 802 illustrated in FIG. 8 all execute the same processing, which correspond to the processing in which the selection of the first file structure discrimination information and the recording medium discrimination are repeated according to the fixed order in processing steps 705 and 706.

Preferred Embodiment 7

Figure 9:
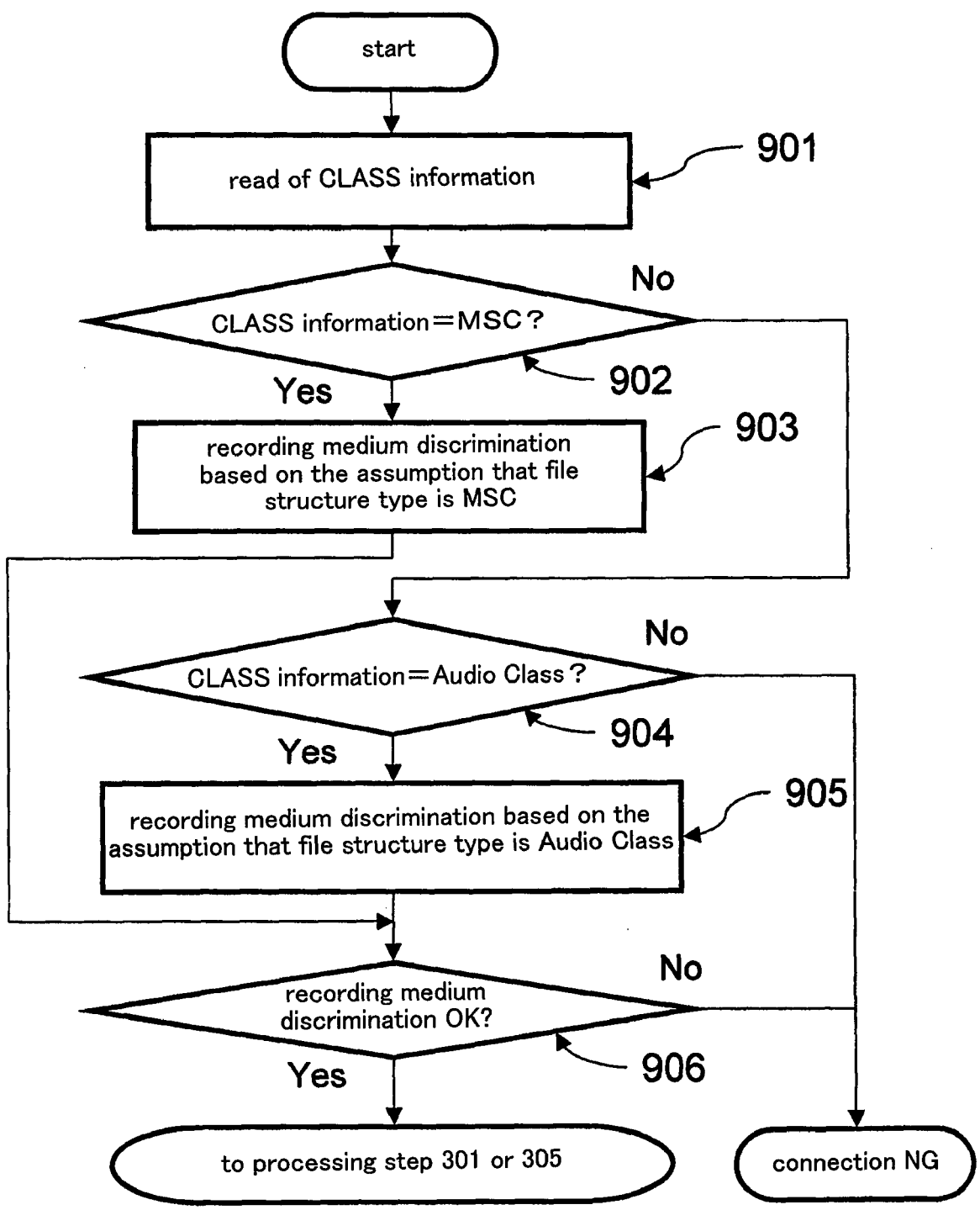
FIG. 9 is a processing flow chart according to a preferred embodiment 7 of the present invention.
Figure 1:
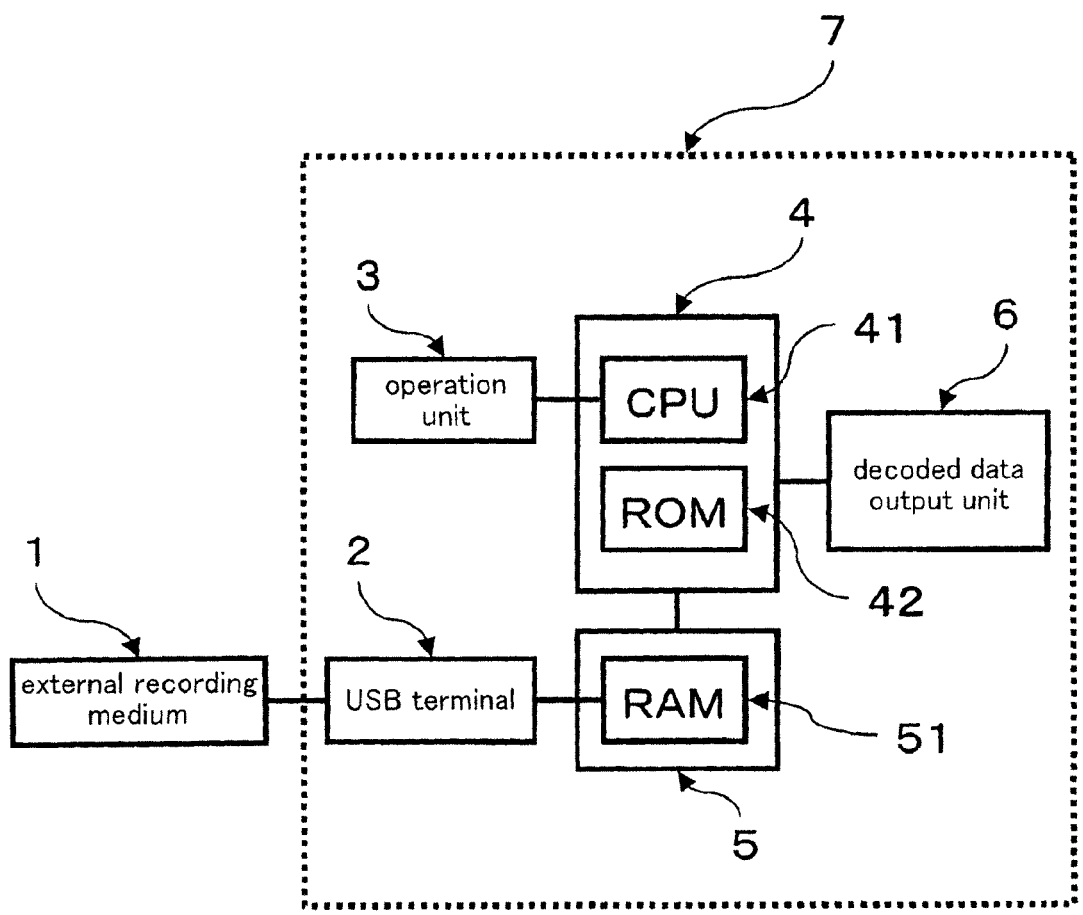

A preferred embodiment 7 of the present invention is described referring to a processing flow illustrated in FIG. 9. When the external recording medium 1 is connected to the interface 2, "CLASS information" is read from the external recording medium 1 in processing step 901. In the present preferred embodiment, it is assumed that "MSC," "Audio Class" or "other CLASS information" are read as the "CLASS information."

It is determined in processing step 902 whether or not the read "CLASS information" is the "MSC." In the case where it is determined in processing step 902 that the read "CLASS information" is the "MSC," the processing shifts to processing steps 903 and 906, wherein the recording medium discrimination process is executed on the premise that the file structure is the "MSC."

In the case where it is determined in processing step 902 that the read "CLASS information" is not the "MSC," the processing shifts to processing step 904, wherein it is determined whether or not the read "CLASS information" is the "Audio Class." In the case where it is determined in processing step 904 that the read "CLASS information" is the "Audio Class," the processing shifts to processing steps 905 and 906, wherein the recording medium discrimination process is executed on the premise that the file structure is the "Audio Class." The recording medium discrimination process according to the present preferred embodiment is similar to that of the preferred embodiment 5.

In the case where the recording medium discrimination result shows NG in processing step 906, or it is determined that the external recording medium is the "other CLASS information" through the discriminating process in processing steps 902 and 904, the processing shifts to processing step 301 or 305 (file analyzing process) illustrated in FIG. 3.

In the description given so far, the preferred embodiments are applied to an audio device; however, semiconductor devices can constitute the processors 8 and 12 and the decoded data output unit 6.

While there has been described what is at present considered to be preferred embodiments of this invention, it will be understood that various modifications may be made therein, and it is intended to cover in the appended claims all such modifications as fall within the true spirit and scope of this invention.

What is claimed is:

1. A decoding device comprising:
an interface to which an external recording medium in which recording medium management information and an encoded file are stored is connected, said recording medium management information includes file rewriting discrimination information used for discrimination of a rewriting state of the file stored in the external recording medium;
a processor for decoding the file read from the external recording medium using file analysis information obtained by analyzing data recorded on the external recording medium; and
a memory in which the file analysis information generated by the processor and the recording medium management information read from the external recording medium are stored, wherein
when the external recording medium connected to the interface is removed therefrom and a new external recording medium is thereafter connected to the interface, the processor selects either first file analysis information read from the memory or second file analysis information generated based on analysis of data recorded on the new external recording medium as the file analysis information to be used for decoding the file stored in the new external recording medium, the processor further makes such a selection based on a comparison between first recording medium management information stored in the memory and second recording medium management information read from the new external recording medium.

2. The decoding device as claimed in claim 1, wherein the memory retains the first file analysis information and the first recording medium management information irrespective of whether or not power is supplied.

3. The decoding device as claimed in claim 1, wherein the processor selects the first file analysis information stored in the memory as the file analysis information used for the decoding process in the case where the first recording medium management information and the second recording medium management information are consistent with each other.

4. The decoding device as claimed in claim 1, wherein the recording medium management information further includes at least one of recording medium discrimination information used for discrimination of the external recording medium and file structure discrimination information used for discrimination of a file structure of the external recording medium.

5. The decoding device as claimed in claim 3, wherein a plurality of pieces of the first recording medium management information corresponding to a plurality of the external recording media so far connected to the interface are stored in the memory as the first recording medium management information, and in the case where the second recording medium management information is consistent with one of the plurality of pieces of the first recording medium management information, the processor selects the first file analysis information corresponding to the first recording medium management information judged as consistent as the file analysis information used for the decoding process.

6. The decoding device as claimed in claim 4, wherein the recording medium discrimination information includes at least one of device ID information and product ID information.

7. The decoding device as claimed in claim 1, wherein the file rewriting discrimination information includes at least one of "available space information" and "total recording capacity information" of the external recording medium, and "physical recording position information of a particular file," "physical recording position information of a particular folder," and "rewriting date and time information of the external recording medium."

8. The decoding device as claimed in claim 1, wherein the recording medium management information includes file structure discrimination information for discrimination of a plurality of file structures in the external recording medium and the recording medium discrimination information used for discrimination of the external recording medium, and when the external recording medium is connected to the interface, the processor reads the recording medium discrimination information stored in the external recording medium and stores the read information in the memory as first recording medium discrimination information, and stores file structure discrimination information obtained by discriminating a file structure of the external recording medium in the memory as first file structure discrimination information, and when the external recording medium connected to the interface is removed therefrom and the new external recording medium is thereafter connected to the interface, the processor reads second recording medium discrimination information from the new external recording medium and reads the first recording medium discrimination information from the memory, and the processor further discriminates the file structure of the new external recording medium using the first file structure discrimination information when it is determined by the processor that the first recording medium discrimination information is consistent with the second recording medium discrimination information, and executes a file structure process for the new external recording medium when it is determined by the processor that the first recording medium discrimination information is inconsistent with the second recording medium discrimination information.

9. The decoding device as claimed in claim 5, wherein the processor preferentially collates the first recording medium management information read from the external recording medium connected immediately before and stored in the memory with the second recording medium management information.

10. The decoding device as claimed in claim 8, wherein the recording medium management information includes a summation result obtained by summing a connection frequency of the external recording medium connected to the interface for each type of file structure of the external recording medium, and the processor discriminates the file structure of the new external recording medium in such an order that a file structure type more frequently connected according to the summation counting result has a higher priority at the time of the discrimination of the file structure of the new external recording medium connected to the interface.

11. The decoding device as claimed in claim 8, wherein the plurality of file structures includes at least one of "Mass Storage Class," "Media Transfer Protocol," "Audio Class" and "HID Class."

12. The decoding device as claimed in claim 8, wherein the file analysis information includes "CLASS number," and the processor discriminates the file structure of the external recording medium based on the "CLASS number."

13. A semiconductor device for reading recording medium management information and an encoded file from an external recording medium connected to an interface, and decoding and outputting the file, comprising:

a processor for decoding the file read from the external recording medium using file analysis information obtained by analyzing data recorded on the external recording medium; and a decoded data output unit for outputting the decoded file, wherein the processor stores the file analysis information obtained from the external recording medium in advance and the recording medium management information in an external memory as first file analysis information and first recording medium management information, said recording medium management information includes file rewriting discrimination information used for discrimination of a rewriting state of the file stored in the external recording medium, and when the external recording medium connected to the interface is removed therefrom and a new external recording medium is connected to the interface, the processor selects either first file analysis information read from the memory or second file analysis information generated based on analysis of data recorded on the new external recording medium as the file analysis information to be used for decoding the file stored in the new external recording medium, and the processor further makes such a selection based on a comparison between first recording medium management information stored in the memory and second recording medium management information read from the new external recording medium.

14. The decoding device as claimed in claim 1, wherein the processor makes said selection based on a comparison between first file rewriting discrimination information stored in the memory and second file rewriting discrimination information read from the new external recording medium.

15. The semiconductor device as claimed in claim 13, wherein the processor makes said selection based on a comparison between first file rewriting discrimination information stored in the memory and second file rewriting discrimination information read from the new external recording medium.

* * * * *